H. E. CAMPBELL

April 7, 1931

Re. 18,026

WINDOW FRAME AND SASH CONSTRUCTION

Original Filed July 24, 1928 3 Sheets-Sheet 1

Inventor.
Harry E. Campbell
By Alan Wheaum
Attorney.

H. E. CAMPBELL

April 7, 1931. Re. 18,026

WINDOW FRAME AND SASH CONSTRUCTION

Original Filed July 24, 1928 3 Sheets-Sheet 2

INVENTOR
Harry E. Campbell
BY
Alan Lithmann
ATTORNEY

H. E. CAMPBELL

April 7, 1931.

Re. 18,026

WINDOW FRAME AND SASH CONSTRUCTION

Original Filed July 24, 1928 3 Sheets-Sheet 3

INVENTOR
Harry E. Campbell
BY
Alan Wilmann
ATTORNEY

Reissued Apr. 7, 1931 Re. 18,026

UNITED STATES PATENT OFFICE

HARRY E. CAMPBELL, OF BALTIMORE, MARYLAND, ASSIGNOR TO CAMPBELL METAL WINDOW CORPORATION, OF BALTIMORE, MARYLAND, A CORPORATION OF MARYLAND

WINDOW FRAME AND SASH CONSTRUCTION

Original No. 1,750,296, dated March 11, 1930, Serial No. 295,085, filed July 24, 1928. Application for reissue filed December 10, 1930. Serial No. 501,444.

This application relates to details of construction of window-frames and sashes whereby the parts may be fabricated and assembled at relatively low cost and whereby the sashes may be readily glazed.

Figure 1:
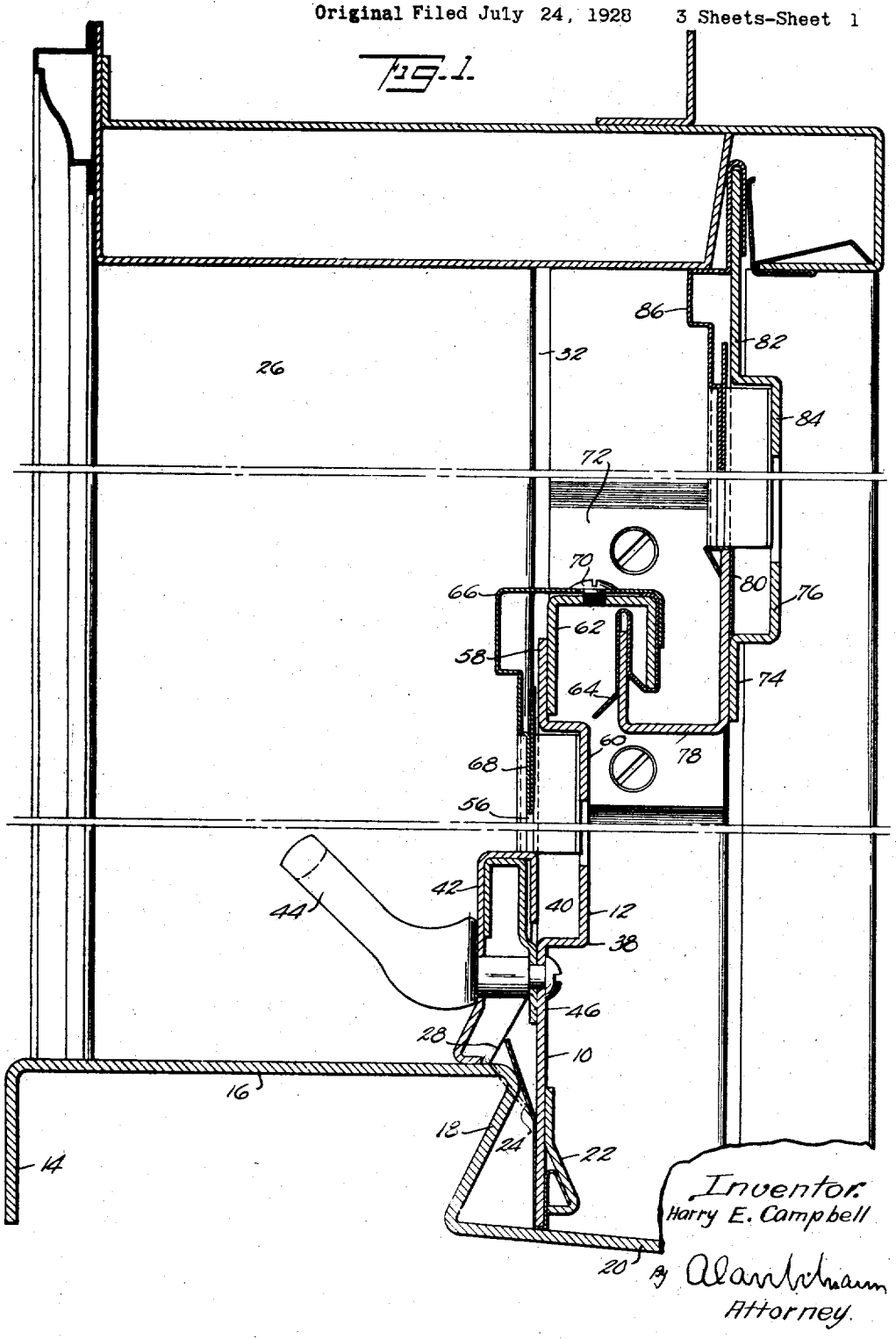
Figure 3:
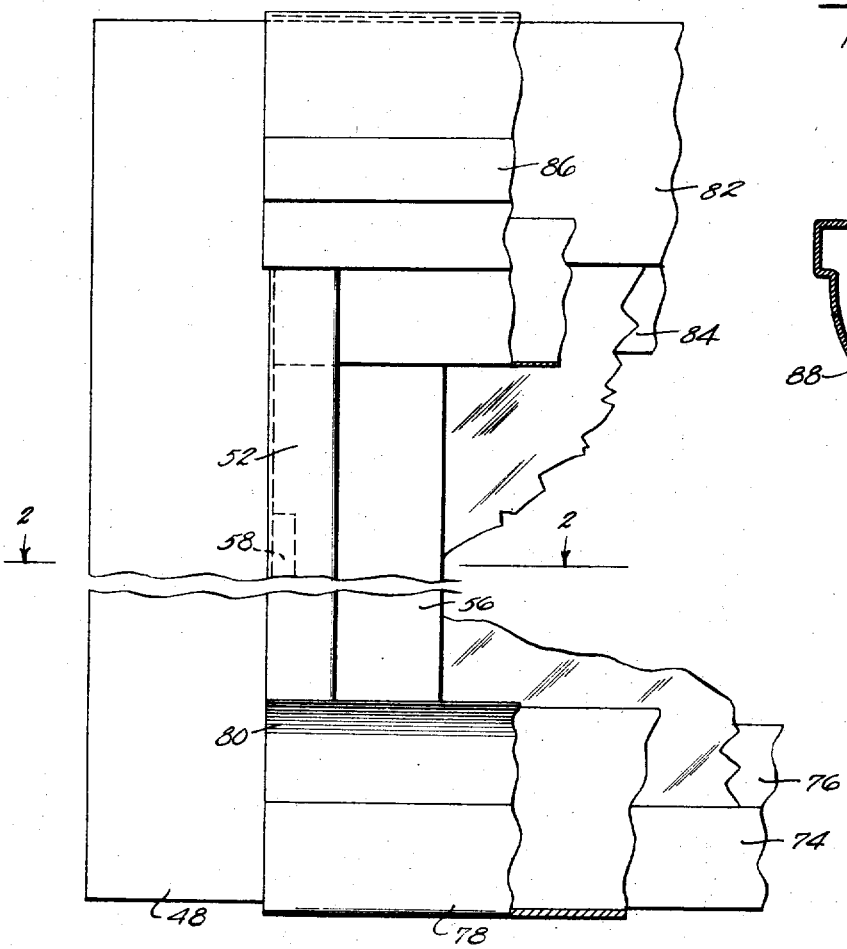
Figure 6:
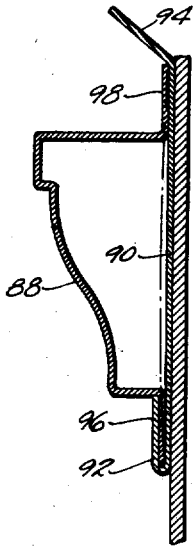
Figure 2:
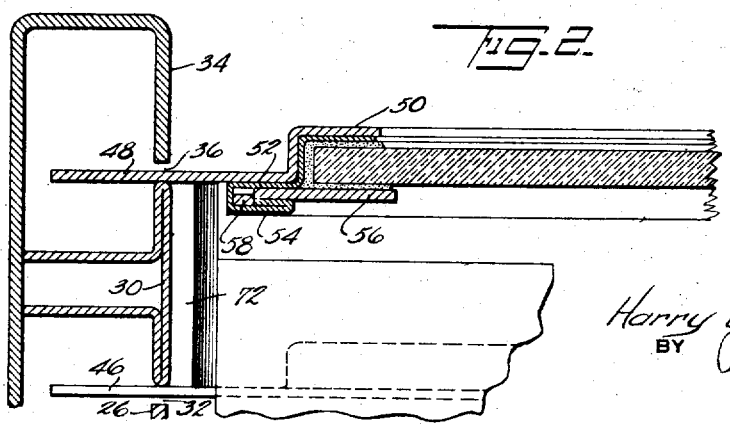
Figures 4, 5:
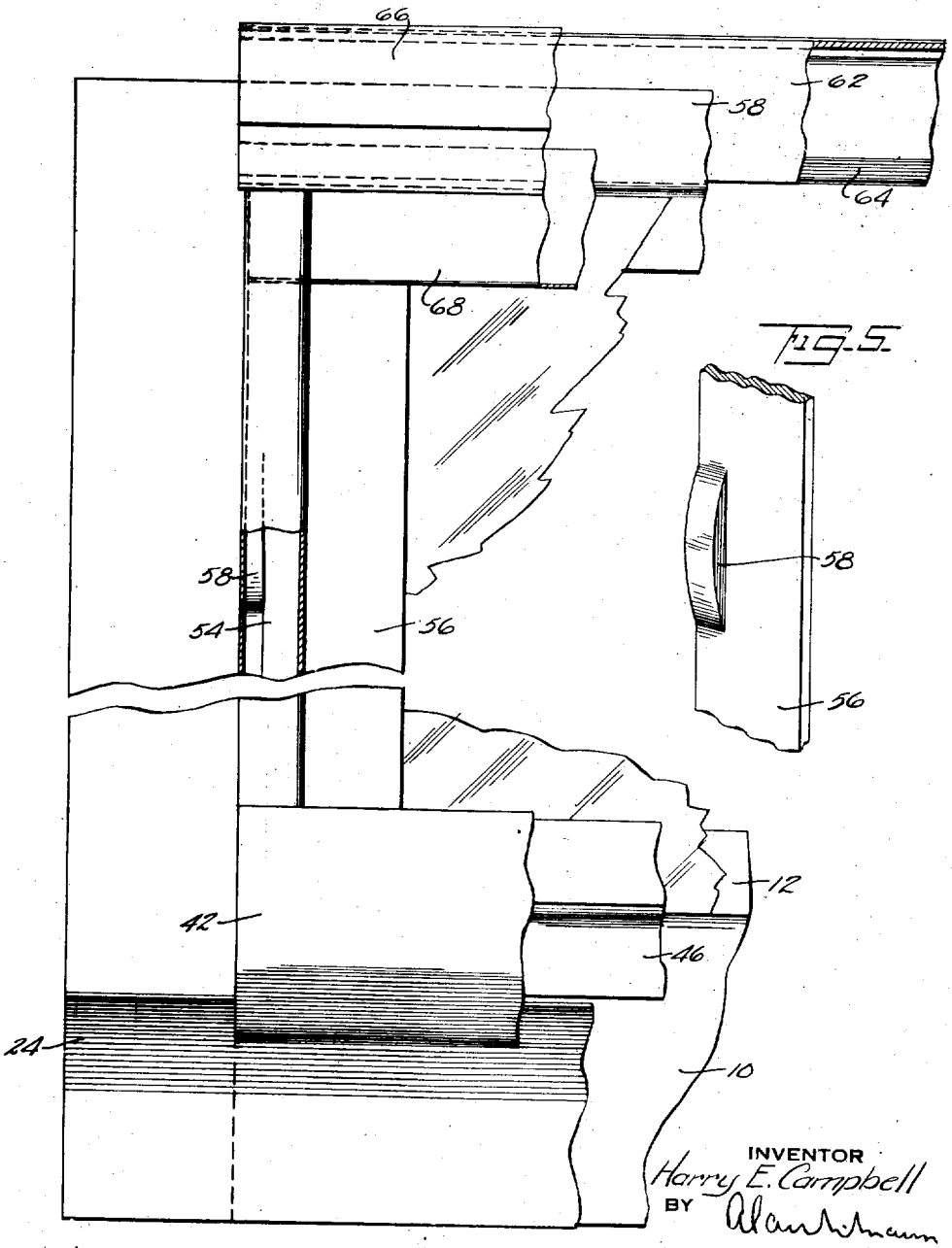

The invention can best be understood by reference to an illustrative example such as is shown in the accompanying drawings, in which Fig. 1 is a vertical section through the sashes, sill and lintel; Fig. 2 is a horizontal section on line 2—2 of Fig. 3, but including the jamb as well as the sash; Fig. 3 is a face view of the upper sash with parts broken away; Fig. 4 is a similar view of the lower sash; Fig. 5 is a perspective view on a slightly enlarged scale showing the interlocking portion of the glass stops, and Fig. 6 is a detailed sectional view showing a manner in which a plaster molding may be attached.

In this illustrative example as shown in Figs. 1 and 4, the lower sash has a bottom plate 10 bent outwardly and again upwardly, as indicated at 12, to form a glass rabbet. Plate 10 is adapted to extend down to meet the sill 14 which has a horizontal portion 16, portion 18 bent down and inwardly and an outwardly extending portion 20. Welded on the outside of the plate 10 is a stop 22 which locks in place a weather seal 24 which is bent around the lower part of the plate 10 and is adapted to make spring contact with the corner formed by the meeting of portions 16 and 18 of the sill. The position which the upper portion of the stop 24 will assume relative to the plate 10 when the lower sash is raised, is indicated by broken lines in Fig. 1.

In the construction here illustrated, the sill 14 is intended to extend to the sides beyond the inner face of the jamb walls, and member 24 extends practically to the outside jamb wall. The inner jamb wall is formed in three parts. The portion 26 lies above the horizontal portion 16 of the sill and has its lower corner cut off as indicated at 28 to permit of movement of the upper edge of weather stop 24. The form of weather strip here shown is separately claimed in my co-pending application, Serial No. 375,384, filed July 2, 1929. The parting strip 30 is positioned away from 26 far enough to form a slot 32, and the balance of the inner jamb wall is formed by plate 34, leaving a slot 36 between it and the parting strip 30. As shown in Fig. 2, there are enlarged chambers back of slots 32 and 36. The member 38 is welded on the plate 10 to form a glass channel 40. This channel is slightly wider than the thickness of glass to be used but is partly filled by the hook-shaped member 42 which contacts with the horizontal portion 16 of the sill, and is held in place by the same screws which hold the lift handle 44 of the plate 10.

The side plates 46 are spot welded on the plate 10 and lie in the same plane with it and are bent to provide a portion lying in the same plane with the portion 12 of the plate 10, thus forming a rabbet for the glass.

The details of construction of the sides of the lower sash are the same as are illustrated in Fig. 2 in connection with the upper sash, where the side plate is designated by the numeral 48 and the glass rabbet is formed by the portion 50. Attached to the plate 48 is a glass stop holder 52. The member 52 is preferably bent to follow the shape of the glass rabbet, as it can most advantageously be connected to the member 48 by spot welding it to the portion 50 of such member. Member 52 extends for a short distance toward the edge of the sash from the glass rabbet, and is then bent into the room, then back toward the center of the window, and given a reverse bend as indicated at 54 to form a glass stop channel with a somewhat restricted opening. Glass stops 56 have formed near their edge at several points bent-out portions 58 as clearly indicated in Fig. 5, and on both sashes the glass stops are put in place by slipping them down from the top with the portion designated 58 in Fig. 5 engaged by the portions 54 of the glass stop holders. If desired, the reverse bent portions 54 can be cut away at various points so that glass stops can be inserted sidewise and then moved endwise into operative position.

In Fig. 4 the details of the sides of the lower sash corresponding to the details that have just been described in connection with the upper sash are designated by corresponding numerals, as the constructions are the same in both of these instances.

Returning to Fig. 1, the meeting rail of the lower sash includes the plate 58, which lies in the same plane with plate 10 and plates 46, and is butt welded to the latter. The plate 58 has a portion 60 bent into the same plane as the portion 12 of plate 10, to form a glass rabbet. Preferably welded to the plate 58 is a hook-shaped member 62 which carries a weather stop 64 intended to embrace the corresponding hook member of the upper sash. The weather stop 64 is held in place by a removable member 66, the shape of which is shown in Fig. 1. It is to be noted that the member 66 has a portion 68 which extends down into the side glass stop grooves and engages the tops of the lower sash glass stops 56. The member 66 is held in place by the screws which attach the usual sash lock (not here shown) and in addition may be held in place, near the sides of the sash, by screws 70. The ends of member 62 abut against a rubbing block 72 when the window is closed.

To glaze the lower sash, the member 66 is removed and the lower sash glass stops 56 are slid upward out of their grooves. The glass is then inserted with its lower edge in the channel 40, and if desired member 42 may be removed to aid this operation and to make it easier to insert the usual putty, though this ordinarily will not be necessary. The glass is then set in putty in the glass rabbet. The lower sash glass stops 56 are slid down into place and member 66 inserted and locked into position by the screws 70 and the screws of the sash lock.

The upper sash has at the meeting rail a plate 74 having a portion 76 bent to form a glass rabbet, and has welded to it a hook-shaped portion 78 which is engaged by the weather stop 64 of the lower sash. If desired, a piece of thin metal bent as indicated at 80 in Fig. 1 may be welded to the hook-shaped member 78 to serve as a base for the glass stop holders 52 which have already been described. The use of this piece of thin metal improves the appearance of the sash but otherwise is not necessary.

At its top, the upper sash has a plate 82 in the same plane as the plate 74 having a portion 84 bent to form the glass rabbet. A member 86, the shape of which is shown in Fig. 1, hooks over the edge of plate 82, and extends down into the glass stop grooves in the same way as portion 68 of member 66. Member 86 can be held in place relative to plate 82 by the screws for the pole socket not here shown. The upper sash is glazed in a manner similar to that heretofore described in connection with the lower sash, by removing member 86 and then sliding the upper sash glass stops 56 upward, permitting the insertion of the glass.

In order further to improve the appearance of the window, I find it desirable to add a plaster mold 88 on the sides and top of the frame, as shown in Fig. 1. The detailed method of attaching the plaster mold 88 is indicated in Fig. 6. I provide a member 90 formed with a hook 92 and free end 94. Member 90 is originally formed with its central portion bowed as indicated in broken lines in Fig. 6. It is then attached to the jamb casing by spot welding it at various points of the casing, which flattens out the bowed portion and holds the edges pressed very tightly against the jamb casing. The plaster mold 88 has two legs 96 and 98, one of which is inserted in the hook 92, after which the free portion 94 of member 90 is bent down around the other leg 98, thus holding the plaster mold in place without the welding points being visible.

From the foregoing description it will be seen that by the constructions here described I am able to do away with the use of many screws and make a window which is very inexpensive to assemble and which can be glazed with great ease.

It is to be understood that the example given is intended only to be illustrative of my invention, as the same may be modified in many particulars.

What I claim is:

1. A window sash construction comprising a bottom rail having members adapted to form a glass channel, side rails each formed to provide a glass rabbet and a glass stop channel, glass stops adapted to slide endwise into operative position in such channels, means adapted to prevent the glass stops from being moved sidewise from their operative position out of said channels, a top rail formed to provide a glass rabbet and a removable member adapted to serve as a top glass stop and adapted to hold the side glass stops against endwise movement.

2. A window sash construction comprising side bars each forming a side plate and a glass rabbet, members connected therewith forming glass stop grooves adjacent such glass rabbets, glass stops adapted to be inserted in such grooves and moved into operative position by endwise movement, means for preventing the glass stops from being removed sidewise from operative position, and removable means for holding the glass stops against endwise movement.

3. A window sash construction in which each side of the sash frame comprises in combination a metal member forming a plate and an offset glass rabbet, a member entering the glass rabbet and welded to said first member and bent to form a glass stop channel, and a glass stop adapted to be inserted in such channel.

4. A window sash construction comprising a bottom rail having members adapted to form a glass channel, side rails each formed to provide a glass rabbet and a glass stop channel, glass stops adapted to slide endwise into operative position in such channels, means adapted to prevent the glass stops from being moved sidewise from their operative position out of said channels, a top rail formed to provide a glass rabbet, a top glass stop, and means for holding the top glass stop in place and for holding said side glass stops against endwise movement.

5. A window sash construction comprising side bars each forming a plate and an offset glass rabbet open to one side of the sash, members united therewith forming glass stop channels adjacent such glass rabbets, enlarged spaces in said channels back of the openings thereto, glass stops adapted to fit into said channels, having projections adapted to extend into such enlarged spaces to hold said glass stops in position in the channels, a top rail forming a glass rabbet and a removable glass stop member for said top rail.

6. A window sash construction comprising side bars each forming a plate and an offset glass rabbet, a member firmly united with each such side member and having a part parallel to said plate and offset therefrom in the opposite direction from said glass rabbet whereby a narrow glass stop channel is formed adjacent the face of said plate, means which restricts the opening to each such channel, a substantially flat glass stop adapted to enter each such channel and to be held therein parallel with said plate, and projections on said glass stops adapted to be engaged by said restricting means whereby said glass stops are held in said channels against dislodgment.

7. A window sash construction in which each side of the sash frame comprises in combination a metal member forming a plate and an offset glass rabbet, a member entering the glass rabbet and welded to said first member and bent to form a glass stop channel with a restricted opening, a glass stop adapted to be inserted in such channel and spaced projections on said glass stop adapted to be engaged back of said restricted opening whereby said glass stop will be held in said channel against dislodgment.

HARRY E. CAMPBELL.